US010961079B2

(12) United States Patent
Morgan et al.

(10) Patent No.: US 10,961,079 B2
(45) Date of Patent: Mar. 30, 2021

(54) AUTOMATICALLY RELEASABLE HOSE REEL ASSEMBLY

(71) Applicant: Reel-Tech Pty Ltd, Mentone (AU)

(72) Inventors: Sean Morgan, Mentone (AU); Stuart Morgan, Mentone (AU)

(73) Assignee: REEL-TECH PTY LTD, Mentone (AU)

( * ) Notice: Subject to any disclaimer, the term of this patent is extended or adjusted under 35 U.S.C. 154(b) by 363 days.

(21) Appl. No.: 15/500,737

(22) PCT Filed: Jul. 30, 2015

(86) PCT No.: PCT/AU2015/050429
§ 371 (c)(1),
(2) Date: Jan. 31, 2017

(87) PCT Pub. No.: WO2016/015103
PCT Pub. Date: Feb. 4, 2016

(65) Prior Publication Data
US 2017/0217721 A1    Aug. 3, 2017

(30) Foreign Application Priority Data
Aug. 1, 2014 (AU) ............................... 2014902991

(51) Int. Cl.
*B65H 75/44* (2006.01)
*B65H 75/34* (2006.01)
(Continued)

(52) U.S. Cl.
CPC ............. *B65H 75/34* (2013.01); *A62C 33/00* (2013.01); *B65H 75/4428* (2013.01);
(Continued)

(58) Field of Classification Search
None
See application file for complete search history.

(56) References Cited

U.S. PATENT DOCUMENTS 3,648,810 A  *  3/1972  Weatherby ............ F16D 13/025
                                                              192/26
4,952,194 A        8/1990  Eckel et al.
(Continued)

FOREIGN PATENT DOCUMENTS

WO   2007113171 A1   10/2007
WO   2011114081 A1    9/2011

*Primary Examiner* — Charles A Fox
*Assistant Examiner* — Ryan P Dodd
(74) *Attorney, Agent, or Firm* — William J. Clemens; Shumaker, Loop & Kendrick, LLP

(57) ABSTRACT

A reel assembly (10) having a spool (20) comprising a drum core (22) and side disc flanges (24) attached to the drum core (22) for retaining a wound hose (26) on the spool (20), and a release mechanism (120) operatively engaging the spool (20) via a drive shaft (110). The release mechanism (120) has a pair of rotatable hubs (132, 134) arranged in axial alignment and having a clamping spring (136) fitted around the rotatable hubs (132, 134) and arranged to clamp the hubs (132, 134) together in fixed rotational relation, wherein the clamping spring (136) opens to releases the rotatable hubs (132, 134) when the spool (20) is rotated in a payout direction so that the rotatable hubs (132, 134) disengage and the spool (20) can freewheel.

4 Claims, 2 Drawing Sheets

(51) Int. Cl.
*F16D 41/20* (2006.01)
*A62C 33/00* (2006.01)
*F16D 41/02* (2006.01)
B65H 75/38 (2006.01)
B65H 75/30 (2006.01)

(52) U.S. Cl.
CPC ..... *B65H 75/4431* (2013.01); *B65H 75/4434* (2013.01); *B65H 75/4463* (2013.01); *B65H 75/4471* (2013.01); *B65H 75/4486* (2013.01); *F16D 41/02* (2013.01); *F16D 41/206* (2013.01); *B65H 75/30* (2013.01); *B65H 75/38* (2013.01); *B65H 2701/33* (2013.01)

(56) References Cited

U.S. PATENT DOCUMENTS

| | | | |
|---|---|---|---|
| 2003/0038011 A1 | 2/2003 | Klawitter | |
| 2006/0049009 A1* | 3/2006 | Arnold | B66D 1/14 |
| | | | 188/82.6 |
| 2007/0209711 A1* | 9/2007 | Morgan | B65H 75/4478 |
| | | | 137/355.2 |

* cited by examiner

AUTOMATICALLY RELEASABLE HOSE REEL ASSEMBLY

FIELD OF THE INVENTION

The present invention relates to hose reel assemblies, and in particular a hose reel assembly having an automatic release mechanism.

BACKGROUND OF THE INVENTION

Industrial hose reels have various applications, such as in firefighting, and general purpose use in industrial plants. For such industrial reel devices, it is desirable for the reel to wind on a hose under control, yet pay out freely as required. Power-operated devices have been used to supply this functionality by relying upon an electromagnetic clutch mechanism which is activated or deactivated as the case may be by an operator when the hose is to be wound or payed out.

As will be appreciated, such reels are often required to be used to respond to emergencies when time is of the essence, and when there are distractions competing for attention. Under such conditions, operators can inadvertently overlook the need to deactivate a drive mechanism to pay out a wound hose for use. Besides delay and inconvenience, this can also result in operator injury as a consequence of vigorously pulling on a wound hose in an attempt to get the reel assembly paying out hose, when the hose reel is not yet released. Moreover, electromechanical drive devices tend to be oversized and underpowered as a consequence of striking an unsatisfactory compromise between the power required to wind a hose at full pay out, and the limited space available in an industrial hose reel assembly. There is in light of the foregoing a need for reel assemblies that at least attempt to address these and other limitations of existing reel assemblies. More particularly, there is a need for a reel assembly that allows for controlled spooling as hose is wound, but which permits freewheeling payout.

SUMMARY OF THE INVENTION

The inventive concept arises from a recognition that a reel assembly can advantageously incorporate a release mechanism that is in effect automatically actuated when a hose wound on the reel is tensioned for payout. Ideally, a reel moreover incorporates such a release mechanism in a simple, robust, compact and mechanical form, which advantageously avoids the use of existing outsized electromechanical clutching devices, which to date have required manual deactivation to achieve release.

Accordingly, the present invention in one aspect provides a reel assembly having a spool comprising a drum core and side disc flanges attached to the drum core for retaining a hose wound on the spool, and a release mechanism operatively engaging the spool via a drive shaft, the release mechanism comprising a pair of rotatable hubs arranged in axial alignment and having a clamping spring fitted around the rotatable hubs and arranged to clamp the hubs together in fixed rotational relation, wherein the clamping spring opens to releases the rotatable hubs when the spool is rotated in a payout direction so that the rotatable hubs disengage and the spool freewheels.

The characterization of 'automatic' in connection with the release mechanism described herein denotes that that tensioning a hose wound on the reel allows the release mechanism to actuate and freewheel in the payout direction, without the need for an operator to directly actuate the release mechanism.

A cam collar is provided in the form of a cylindrical sleeve having cam ramps that provide a ratcheting function in conjunction with the pawling action of a spring-loaded contact pin that bears against the surface of the cam collar. The ratcheting action of the cam collar and cam ramps co-operating with the loaded contact pin arrests rotation of the cam collar when the spool is being payed out, but permits rotation of the cam collar when the hose is being wound. The cam ramps are angled or graduated against the tangential profile of the cam collar to further tension the contact pin as it passes over the cam ramps. The cam ramps terminate in a stop, which acts to arrest rotation of the cam collar, when the contact pin is bearing against it.

The ratcheting action of the cam collar and contact pin thus encourages uni-directional rotation of the cam collar in a direction corresponding with the payout direction of the hose, while resisting rotation in the opposite direction, as the stop at the end of the cam ramp presents a locking barrier to rotation owing to interference with the loaded contact pin. The spring has an inside diameter which is slightly smaller than the outside diameter of the input and output hubs. The spring is preferably made from high tensile steel. As the spring is force fit over the input and output hubs, the spring positively engages the hubs. When the drive shaft is torqued for rotation to retract the hose, the spring grips the hubs more tightly and consequently does not slip.

The spring preferably but advantageously features tangs at its opposed terminal ends so that it can be loosened by force selectively applied to the spring via the tangs. Preferably, the tangs comprise a control tang at one end of the spring, and an optional end tang at the opposed end of the spring.

The first and second parts of the drive shaft are preferably linked by one or more pins that act to align the shafts to minimize relative axial displacement. Together with a sleeve shrouding the drive shaft parts, the pins are effective to make the drive shaft parts co-operate as an integral drive shaft. The advantage of the two drive shaft parts is they permit assembly of the drive shaft from opposed directions and to be advantageously received at their respective abutting ends.

Advantageously, but preferably, the release mechanism has an upper limit to the clamping force applied during winding, as a safety release feature should (for example) the hose become inadvertently tangled, such as by an operator becoming caught up in the hose. The hose ceases to wind when resistance exceeds a threshold.

The input hub and the output hub can rotate independently relative to each other, though the hubs are locked in by a clamp spring which clamps the hubs so that they remain in a fixed rotational relation when hose is not being payed out. Advantageously, the input hub is fixed in rotational relation to a clutch shaft that is operably connected to the spool, whereas the output hub is fixed in rotational relation to a coaxial shaft that is coupled to the output drive shaft.

The drive shaft is optionally connected to the reel hub via the gearing assembly for gear reduction, depending on the application, for example to adapt to a reel assembly having a heavy load specification, or small motor capacity. The drive shaft may optionally cooperate with a manual crank to directly manually drive the reel.

The release mechanism advantageously operates to permit controlled winding of a hose onto the spool. Typically, a motor is required to wind the (unwound) hose onto the reel, particularly when the hose is extensively paid out. As the hose is wound in, the load is reduced on the motor and there is an elevated risk of the end of the hose dangerously whipping an operator or bystander.

The release mechanism also permits payout of the item with minimal frictional resistance. Whilst it might be considered desirable to have almost no resistance on payout, in most applications a small amount of frictional resistance avoids unchecked payout. Over-spooling can be avoided by a drag brake, incorporated as an adjunct device separate to the release mechanism.

DESCRIPTION OF DRAWINGS

FIG. 3 is a schematic side sectional view of a cam collar and contact pin used in the mechanism of FIG. 2.

DESCRIPTION OF PREFERRED EMBODIMENTS

Figure 1:
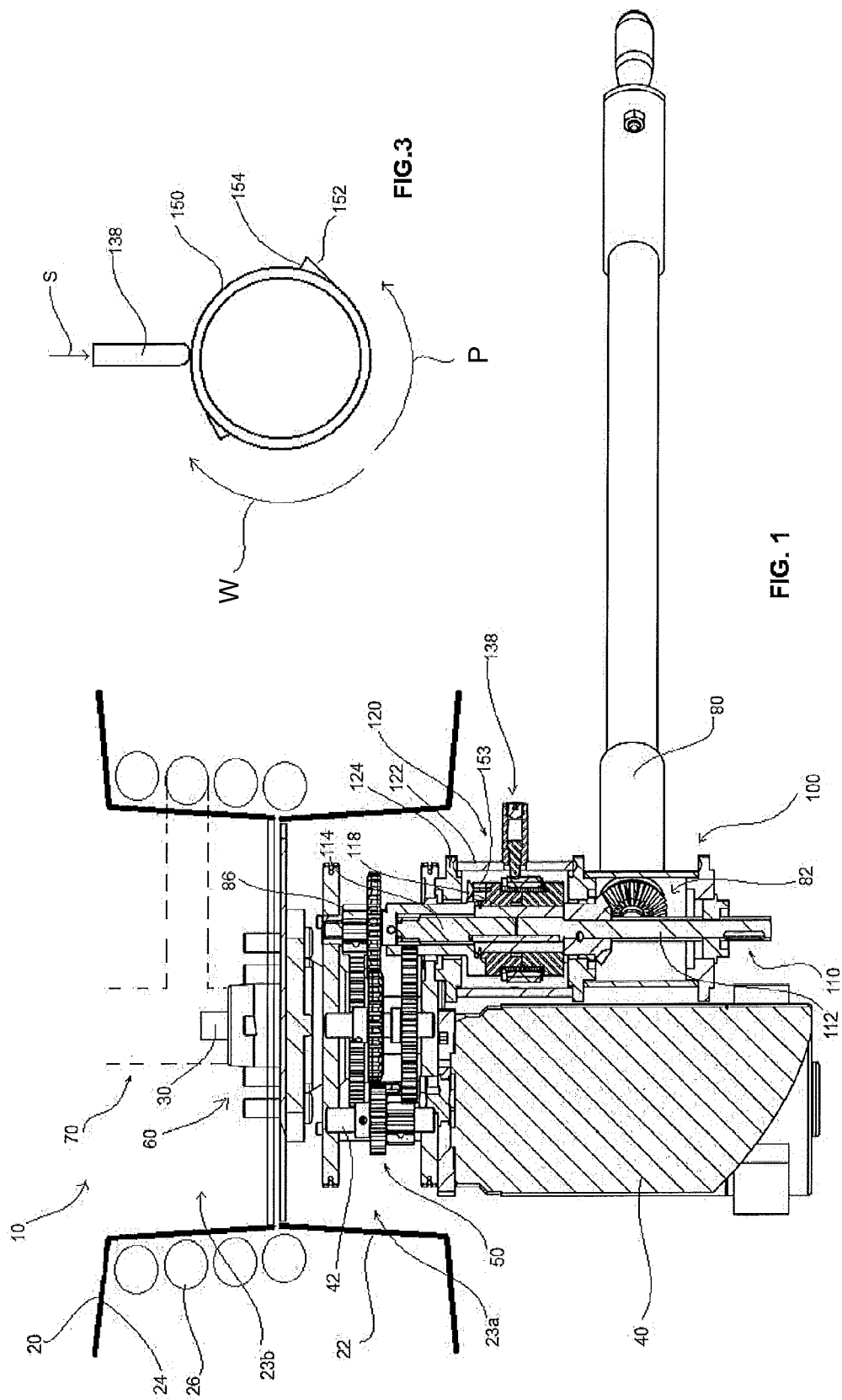
FIG. 1 is a side sectional view of a reel according to a preferred embodiment of the present invention.

FIG. 1 depicts a reel assembly 10 comprising a spool 20, a hub shaft 30, an electric motor 40, a gear assembly 50, a reel hub generally referenced 60, a riser assembly 70, a removable manual power takeoff (PTO) 80, and a release assembly 100.

The spool 20 may be used, for example, for a fire hose or similar and comprises a central core drum 22 defining a pair of central cavities 23a, 23b. The first cavity 23a is adapted to house the gear assembly 50. The second cavity 23b is adapted to house the riser assembly 70. The gear assembly 50 and the riser assembly 70 are mounted either side of the hub 60 in the central cavities 23a, 23b. Hose 26 is wound onto the spool 20 and retained on the core drum 22 by side disc flanges 24.

The electric motor 40 is preferably an AC electrical motor, suitable for mains usage, but could also be a DC motor, or indeed another form of motor such as a spring motors, or a hydraulic or pneumatic motor. The electric motor is preferably main power driven, but may be alternatively or additionally powered via a battery and inverter for portability.

The gear assembly 50 comprises a planetary gear reduction set as indicated to achieve ratios suitable to adapt the power capacity of the electric motor 40 to the load requirements of the spool 20. As an example, of the order of reduction that may be useful, a gear reduction ratio of 10:1 may be used. A variety of different gearing arrangements may be adopted as dictated by application, as would be understood by a person skilled in the art.

The reel assembly 10 may be simply manually powered by a removable manual crank 80 having a gear reduction ratio of the order of 4:1, depending on the load requirements of any particular application.

Figure 2:
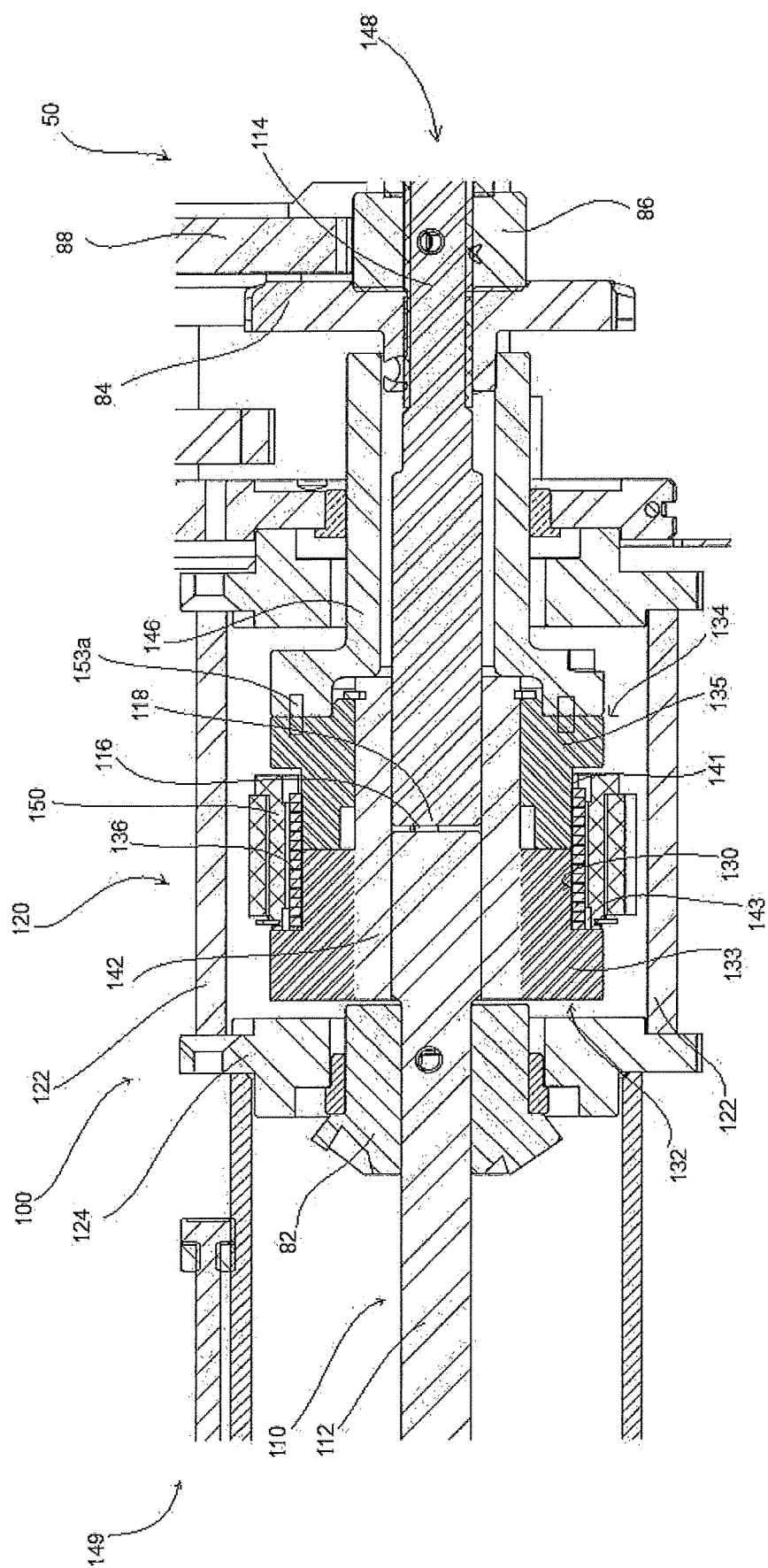
FIG. 2 is a side sectional view of an automatic release mechanism of the hose reel depicted in FIG. 1.

FIG. 2 depicts the release assembly 100 of FIG. 1 in detail, omitting the manual crank 80 of FIG. 1, which is for convenience removable.

The release assembly 100 comprises a release mechanism 120 housed in a cylindrical canister 122, and secured in a frame 124. Extending coaxially and longitudinally through the release assembly 100 is a drive shaft 110, formed from an input shaft 112, coaxially pinned to an output shaft 114 by axial pins 116 at an intermediate point 118 within an automatic release mechanism 120. The drive shaft 110 is not fixed for rotation with manual crank bevel gear 82 and with power-driven gears 84 forming part of the gear assembly 50 connecting the drive shaft 110 to the motor drive shaft 42 in a 10:1 reduction ratio.

The drive shaft 110 may be driven by the manual crank 80 via the bevel gear transfer assembly 82 at a 4:1 reduction ratio. At the spool end 148 of the drive shaft 110 (the second shaft 114), the drive shaft 110 is directly coupled to main gear 86 which is coupled to a gear set 88 that connects directly to the reel hub 30.

A sleeve 142 is provided shrouding the shafts 112, 114, and which is adapted to provide a strong join for the abutting ends of the separate shafts 112, 114. The sleeve 142 acts as a bearing bush, and features internal keyed surface features complementary to the shafts 112, 114 to ensure positive engagement thereto. Mounted on the sleeve 142 and fixed by press fit (and optionally additionally with positive pin fasteners) to the external surface of the sleeve 142 for rotation therewith is a first clutch hub 132.

Arranged in coaxially alignment and abutting the input hub 132 is an output hub 134 that is coaxial and fixed by pins 153a to a coaxial shaft 146 extending rearward towards the gear assembly 50 and mounted for rotation about the output shaft 114.

The output hub 134 is not positively fixed to the input hub 132 and is adapted to rotate relative to the input hub 132 about a longitudinal axis of the drive shaft 110, although the default state of the release mechanism 120 is a clamped configuration, as will be described in further detail below.

The input and output hubs 132, 134 coaxially shroud and receive the sleeve 142. The sleeve 142 is fixed to the input hub 132, whereas the output hub 134 freely rotates about the sleeve 142 unless the release mechanism 120 is in the clamped configuration as will be described.

The coaxial shaft 146 and output hub 134 are fixed for rotation with a gear set 84 that only freely rotates about the drive shaft 110 when the release mechanism 120 is disengaged as the reel assembly 10 is paying out. The gear set 84 is operatively connected to the powered drive shaft 42.

The input and output hubs 132, 134 jointly define a cylindrical body 130, which has at its ends annular heads 133, 135 of enlarged diameter compared to an intervening section of the cylindrical body 130. The annular heads 133, 135 act to retain and center the spring 136 on the cylindrical body 130.

A spring 136 is fitted on the cylindrical body 130 as depicted, and is ordinarily arranged in a force fit clamping the hubs 132, 134. The spring 136 advantageously has a control tang 143 which can be engaged at a first end 149 by a cam collar 150. It is contemplated that another lateral end tang 141 is secured at an opposed end 148 of the spring 136 to the output hub 134.

The cam collar 150 comprises a substantially cylindrical sleeve that shrouds the spring 136 and acts on the spring 136 by applying force to the spring 136 via the control tang 143 to loosen the spring 136.

As shown in FIG. 1, bearing laterally and radially inwardly on the cam collar 150 is a spring-loaded contact pin 138 acting as a loaded pawl, which bears on an outer surface of the cam collar 150 by the urging of its biasing spring.

FIG. 3 depicts this ratchet or camming arrangement in schematic form for simplicity and ease of understanding. A force S provided by the biasing spring acts on the contact pin 138. The contact pin 138 as represented may have a bearing surface arranged to provide a sharp angle of approach when engaging cam ramps 152 disposed on the surface of the cam collar 150 to minimize resistance in the winding direction W.

This ensures that the default position of the contact pin 138 is to ride over the cam collar 150 so that the release mechanism 100 remains normally in the clamped configuration so that the drive shaft 110 is fixed for rotation relative to the coaxial shaft 146, gear assembly 84 and driven motor shaft 42, the drive shaft 110 being fixed for rotation together with the reel spool 20. As described and depicted, the cam collar 150 features cam ramps 152 on its outer surface that act as ratchet teeth, and permit the contact pin 138 to ride up and over the cam ramp 152 surface when the output hub 134 is driven in the winding direction W.

The contact pin 138 is oriented substantially radially relative to the shaft 110 to achieve good interference with a stop 154 of a cam ramp 152 in the payout direction P. The contact pin 138 bears against the cam collar 150 to halt its rotation, the control tang 143 stops with the cam collar 150 and this has the effect of causing the spring 136 to open, uncoil and loosen its grip about the cylindrical body 130, whereby the second clutch hub 134 is released and is no longer fixed relative to the sleeve 142 or the input clutch hub 132. As the output hub 134 is restricted in its rotation by the drag of the motor 40 through the drive gears 84, disengaging the output hub 134 from the input clutch hub 132 and the sleeve 142 permits the reel spool 20 operatively connected by gears to the drive shaft 110 to rotate with minimal frictional resistance or drag to permit easy payout by an operator. This is an automatic setting in the sense that simply tensioning of the hose 26 by an operator in the payout direction P releases the release mechanism 120 and permits the operator to easily draw out the hose 26 without having to adjust the release mechanism 120 or pull a lever or switch, etc.

When the drive shaft 110 is permanently coupled to the reel spool 20 by gears stationary or, the contact pin 138 immediately abuts against a steep detent ramp surface 154 of the cam ramp 152 causing the stop lobe 150 to stop rotating, but the shaft 110 continues to rotate. The control tang 143 and optional stop tang 141 are now relatively counter-rotated and the spring 136 loosens about the cylindrical body 130 like releasing a boa constrictor or tourniquet and the input and output hubs 132, 134 are substantially released from engagement.

It is contemplated that the stop 154 may itself be slightly inclined to permit a safety release, should the load on the contact pin 138 become excessive—which might occur if the hose 26 becomes tangled, for example.

The reel assembly 100 operates from an operator's perspective as follows. The release mechanism 120 is engaged as the reel assembly 10 is wound in the winding direction W, or when stationary (that is, not rotating). When an operator manually starts to draw the hose 26 off the spool 20, the release mechanism 120 releases to enable the reel assembly 10 to freewheel in the payout direction.

Freewheeling is enabled because while the contact pin 138 remains pressed against the cam collar 150, the orientation of the cam ramps 152 prevents free rotation of the cam collar 150 in the payout direction. This allows the spring 136 to uncoil or loosen slightly, which causes the release mechanism 120 to disengage and permit rotation of the reel spool 20 with minimal frictional resistance.

While features of a preferred embodiment of the present invention are described and depicted herein, it is to be understood that these specific features do not limit the scope of the invention.

The invention claimed is:

1. A reel assembly having a spool comprising a drum core and side disc flanges attached to the drum core for retaining a wound hose on the spool, and a release mechanism operatively engaging the spool via a drive shaft, the release mechanism comprising a pair of rotatable hubs arranged in axial alignment and having a clamping spring fitted around the rotatable hubs and arranged to clamp the hubs together in fixed rotational relation, wherein the clamping spring opens to release the rotatable hubs when the spool is rotated in a payout direction so that the rotatable hubs disengage and the spool freewheels, wherein a cam collar is disposed around the clamping spring, and adapted to open the clamping spring when the spool is rotated in a payout direction, and a biased contact pin that bears against the cam collar, wherein the cam collar has cam ramps that provide a ratcheting action by arresting rotation of the cam collar when the spool is being payed out, and permitting rotation of the cam collar in an opposite sense when the spool is being wound.

2. The reel assembly according to claim 1, wherein the clamping spring has a control tang that is engaged by the cam collar to open the clamping spring.

3. The reel assembly according to claim 2, wherein the clamping spring also has an end tang co-operating with the control tang to open the clamping spring.

4. The reel assembly according to claim 1, wherein the rotatable hubs comprise an input hub and an output hub arranged adjacent the input hub, and wherein the output hub is fixed relative to the drive shaft, and the input hub is fixed relative to a coaxial shaft mounted for rotation with the drive shaft.

* * * * *